3,794,694
ROOM TEMPERATURE VULCANIZABLE GRAFT COPOLYMERS ON SILICONE CONTAINING BACKBONE

Rajendra Nath Chadha, Farmingdale, N.Y., and James Edwin Crawford, Adrian, and John Charles Getson and Richard Newton Lewis, Tecumseh, Mich.; said Chadha, said Lewis and said Getson assignors to Stauffer Chemical Company No Drawing. Continuation-in-part of application Ser. No. 849,541, July 14, 1969, which is a continuation of application Ser. No. 554,683, June 2, 1966, now abandoned. This application Nov. 9, 1970, Ser. No. 88,145

Int. Cl. C08f 35/02; C08g 47/10

U.S. Cl. 260—827    11 Claims

ABSTRACT OF THE DISCLOSURE

A liquid composition comprising an organopolysiloxane having grafted thereto through an alkylene group a polymeric organic side chain constituted of recurring units derived from unsaturated monomers of vinyl aromatic compounds and/or unsaturated esters or combinations of these monomers with other unsaturated monomers and its use as a room-temperature-vulcanizing composition.

---

This application is a continuation-in-part application of copending application Serial Number 849,541 filed July 14, 1969, which was a continuation of copending application Ser. No. 554,683 filed June 2, 1966, now abandoned.

This invention relates to silicone compositions of the type generally classified as room-temperature-curing or vulcanizing compositions.

As exemplary of such compositions may be noted the disclosure of Berridge Patent U.S. 2,843,555, and that of U.S. Patent 3,035,016, to Leonard B. Bruner. The identified patents respectively illustrate a "two-component" and a "one-component" room-temperature-vulcanizing (RTV) system. These systems are distinguished in that the one-component system, unlike the two-component system, does not require addition of a catalyst at the work site to bring about the curing. In either case, the composition is based on an organopolysiloxane fluid of linear structure having terminal hydroxyl groups each of which is bonded to a silicon atom.

The Berridge composition includes as a necessary ingredient a cross-linking agent, specifically ethyl silicate, which on addition of the catalyst reacts with the terminal hydroxy groups to form reactive sites leading to condensation and cross-linking of the organopolysiloxane molecules—this being the mechanism of the cure. Bruner, on the other, converts the terminal hydroxy groups of the silicone material to acyloxy radicals which on use of the composition hydrolyze from the effect of ambient moisture to create such sites.

In general, the two-component or two-package system is employed in commercial establishments where precise measuring equipment is available and adequate control over processing procedures is possible. The one-component system is especially applicable where considerable variation in cure time is permissible. Also, it is manifestly advantageous in situations where the available labor is unskilled and any weighing and mixing operations are consequently best avoided.

The compositions discussed supra are normally reinforced with selected fillers; in fact they have little if any utility unless so reinforced, being extremely frangible in the unreinforced form. As reinforced, they have been employed commercially in various applications. Thus, they have been used for caulking and in the preparation of molds. Also, they have been found in the insulation of electrical components by encapsulation and in the fabrication of dielectric gasket materials and cushioning devices. Additionally, they have been employed as sealants for joints betwen adjacent sections of concrete highways, their rubber-like character in the cured form adapting them for the expansion and contraction of such sections occurring with sudden extremes of temperature. In this highway application, the reinforced sealing material, instead of being directly applied to the joint, is added to a fibrous carrier having generally the form of a rope which is forced between the adjacent concrete sections.

The prior compositions, despite their high filler loading, are relatively costly as compared to polymeric organic products with which they compete in certain areas. As a consequence, their use in these areas is largely restricted to situations demanding dielectric capability. Employment of these compositions in other areas is in many instances barred because they fail to meet specifications, particularly as regards tensile strength, tear resistance, and hardness with retained flexibility.

A principal object of the present invention is to provide a silicone-containing RTV material having satisfactory tensile strength, tear resistance and elongation.

Another object is to provide a material of such category adapted to be employed, when desirable, in an unreinforced state; that is, free of filler material.

Still another object of this invention is to provide a liquid composition comprising an organopolysiloxane having a polymeric organic side chain grafted thereto.

A further object is to provide a copolymeric RTV material comprising a silicone portion and an organic portion which synergistically reflects the individual advantages of silicone polymers and purely organic polymers as separately employed in the production of RTV compositions.

The foregoing objects and others which will become apparent from the following discussion are accomplished in accordance with this invention, generally speaking, by providing a liquid composition in which an organopolysiloxane has terminal hydroxyl groups, or in place thereof terminal groups hydrolyzable by ambient moisture, and contains at least one polymeric group linked to the organopolysiloxane backbone through an aliphatic carbon atom forming a part of such backbone. The polymeric groups may be derived via any suitable grafting procedure from unsaturated monomers of vinyl aromatic compounds and/or unsaturated esters or combinations of these monomers with other unsaturated monomers.

It is to be understood that a composition as above defined, when the same contains terminal hydroxyl groups, is intended for use with a cross-linking agent or catalyst, whereas no cross-linking agent or catalyst is contemplated if the terminal groups are of themselves hydrolyzable by ambient moisture.

The grafting operation is most expeditiously effected using a free-radical initiator, normally a peroxide. As little as 0.05 percent of the more active peroxide initiators (on the weight of the reactants) is adequate in most cases.

Higher levels increase the reaction rate and as much as 2 percent or even more of the initiator sometimes may be used. However, it is advisable as a general rule not to exceed 1.0 percent since higher concentrations tend to promote coupling reactions, undesirably increasing the viscosity of the reaction mixture.

Using a free-radical initiator, the reaction when carried out batch-wise generally proceeds at a satisfactory rate if the temperature is maintained in the area of 60° C. to 130° C. If a continuous process is employed, or if the reaction is carried out batch-wise without a free-radical initiator, substantially higher temperatures i.e. upwards of 190° C. may be advantageous.

The most suitable peroxide initiators are those in which at least one of the peroxide oxygens is attached to a tertiary carbon atom. As exemplary of these may be mentioned: dialkyl peroxides, such as di-t-butyl and dicumyl peroxide; hydroperoxides such as t-butyl hydroperoxide, cumene hydroperoxide and decalin hydroperoxide; cyclic peroxides such as ascaridole and 1,5-dimethylhexane-1,5-peroxide; and peresters such as t-butyl perbenzoate, t-butylperoxy isopropyl carbonate and t-butyl peroctoate, ketone peroxides such as acetone peroxide and cyclohexanone peroxide are also applicable.

Acyl peroxides and peracids may be used in the practice of the invention, but in general they result in less grafting, i.e. poorer yields of the grafted product. The difference is believed to lie in the nature of the radicals produced. Thus, tertiary alkoxy radicals from di-t-butyl peroxide, for example, have a strong tendency to abstract hydrogen atoms, and this is a necessary step in grafting. On the other hand, acyloxy radicals produced from an acyl peroxide, e.g. benzoyl peroxide, while effective polymerization initiators, are relatively ineffective hydrogen abstractors.

Although it may be possible to carry out the grafting using organopolysiloxane material free of terminal hydroxy groups or groups hydrolyzable by ambient moisture and to subsequently treat the graft polymer to incorporate such groups, it is preferred in the grafting operation to start with an organopolysiloxane having terminal hydroxy groups. Following this practice, where a one-component RTV composition is desired, the graft polymer following the grafting is appropriately treated to convert the hydroxyl groups to groups hydrolyzable by ambient moisture.

The hydroxy organopolysiloxane material may contain in minor proportion molecules having only one hydroxyl group or there may be a small number of molecules present carrying in excess of two hydroxyl groups. It is preferred, in any event, that the hydroxy organopolysiloxane material average out to from 1.75 to 2.25 hydroxyl groups per molecule.

The chain length of the siloxane is important, although grafting has been found to occur with siloxanes of almost any length. If the siloxane material predominates in molecules of short chain length many of these will remain unreacted. One the other hand, very long chain material results in a grafted product that is extremely viscous and difficult to manage in some applications. In general, hydroxy polysiloxanes with a degree of polymerization between 100 and 1000 are recommended. This is equivalent to a viscosity between about 100 and 30,000 centipoises. Most preferably, the viscosity of the hydroxy siloxane material lies within the range 200 to 4000 centipoises. Where an easily pourable graft product is desired, as for a sealant application, optimum results are usually achieved in the lower portion of such ranges, i.e. 300 to 500 centipoises.

The hydroxy-organopolysiloxanes preferred for use according to the invention are represented by the formula

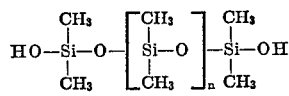

in which $n$, as indicated supra, has a value between 100 and 1000.

The invention may, of course, be practiced using hydroxy siloxane material containing short aliphatic groups other than methyl. In any case, the material may comprise aryl groups up to a maximum of 25 percent; indeed in some instances the presence of aromatic groups may be advantageous.

The proportion of organic monomer or monomers used in the grafting reaction may be varied within wide limits. However, the more significant improvements in physical properties vis-a-vis the prior-art compositions have been attained where the reaction mixture has comprised from 30 to 75 percent by weight organic monomer or monomers. Most preferably, the organic monomer portion accounts for from 40 to 65 percent of the total weight of the reactants.

In preparing a liquid grafted product containing more than 30 percent monomer, it is essential that at least one of the monoethylenic unsaturated monomers be a vinyl aromatic compound or an unsaturated ester of an organic acid in which either the esterifying group or the derivative acid is unsaturated. These monomers may be used alone or in combination with other unsaturated monomers such as organic acids, amides, nitriles, anhydrides, silanes and aliphatic hydrocarbons.

Examples of suitable vinyl aromatic compounds are styrene, ring-substituted styrenes, vinylpyridine, vinylnaphthalene and the like. Esters of organic acids which may be used, either alone or in combination with other unsaturated monomers, are vinyl acetate, vinyl propionate, vinyl butyrate, vinyl caproate, vinyl alpha-chloropropionate, vinyl alpha-chlorobutyrate; esters of acrylic acid and substituted acrylic acid, such as methyl acrylate, ethyl acrylate, butyl acrylate, octyl acrylate, methyl methacrylate, ethyl methylacrylate, butyl methacrylate, hexyl methacrylate, 2-ethylhexyl methacrylate, decyl methacrylate, and the like.

Other monomers which may be used in combination with the above are vinyl halides such as vinyl chloride and vinyl fluoride; disubstituted ethylenes of the type $CH_2=CX_2$ also may be used including vinylidene fluoride, vinylidene cyanide, derivatives of acrylic acid and methacrylic acid including the salts, amides, and nitriles such as acrylonitrile, methacrolein, methacrylonitrile; N-vinyl compounds such as vinylcarbazole, N-vinylcaprolactam and vinyl silicon compounds such as vinyltriethoxysilane.

Applicable disubstituted ethylenes of the type $$CHX=CHX$$

comprise vinylene carbonate and various monomers that polymerize best in the presence of other monomers, e.g., maleic anhydride, silbene, indene and coumarone.

As before emphasized, the monomers may be used singly or in combinations of two or three or even more. The properties of the graft product, of course, depend on the nature and identity of the monomer material as well as on the amounts used relative to the hydroxy-organopolysiloxane. Monomers that give elastomeric homopolymers generally provide elastomeric graft products while those that give plastic homopolymers tend to yield graft products which are less elastic. By using at least one monomer from each class, graft products can be obtained meeting requirements which the prior compositions cannot approach. Particularly excellent results have been achieved in this connection through the employment of styrene and substituted styrenes in conjunction with acrylates and methacrylates. Following are examples of styrene-acrylate combinations which have been successfully graft polymerized with hydroxy-terminated polydimethylsiloxanes to form liquid products.

Styrene-butyl acrylate
Styrene-butyl methacrylate
Styrene-butyl acrylate-acrylonitrile
Styrene-acrylic acid Styrene-2-ethylhexyl acrylate
Styrene-2-ethylhexyl acrylate-butyl acrylate
Styrene-ethyl methacrylate
Styrene-butyl acrylate-acrylamide
Styrene-butyl acrylate-maleic anhydride
Styrene-butyl acrylate-acrylic acid
Styrene-isobutyl methacrylate Where a combination of monomers as above is employed, the relative proportion of each monomer is, of course, determined as previously suggested by the characteristics desired in the cured composition. In general, compositions with a desirable balance of properties result when the ratio of acrylate to styrene or other vinyl aromatic is in the range 1:3 to 3:1 on a weight basis.

When the invention herein is applied as a one-package system the required cross-linking during curing may be attained by adding to the graft product before the packaging operation a silane of the general formula $XSiY_3$, where X is a relatively inert group as alkyl, alkoxy, or aryl and Y is a group as acyloxy, oximo, dialkylaminooxy and the like, readily hydrolyzable by ambient moisture. Exemplary of such silanes are methyltriacetoxysilane, isopropoxytriacetoxysilane, methyltriacetoximosilane, methyl-tris-diethylaminooxysilane, etc.

Following the usual procedure, the cross-linking agent is added to the graft product immediately after formation thereof and while the same is still hot or at least warm. The graft product at this point may or may not have a filler mixed therewith. At any rate, under such conditions the conversion of the terminal hydroxyl groups carried by the graft product to acyloxy groups, for example, occurs immediately. Even if the filled or unfilled grafted product is permitted to cool, the indicated reaction will take place in the package, being normally complete before the package reaches the ultimate consumer.

If it is desired to apply the invention to a two-package, system, the cross-linking of the grafted product, filled or unfilled, may be provided for by incorporating in the package with the graft polymer a polyalkoxysilane or a polyalkoxysiloxane. The polyalkoxy compound, e.g. ethyl orthosilicate or a partially hydrolyzed ethyl silicate as "Ethyl Silicate 40," which is approximately decaethyl tetrasilicate, is best used in proportions of from about 0.5 to about 5 percent by weight on the graft product.

The second package of the two-package system, of course, contains the catalyst which is desirably a tin compound, e.g. dibutyltindilaurate, dibutyltinbutoxychloride, etc. The amount of catalyst used is determined by the cure rate desired. Usually, the catalyst is employed in proportions within the range 0.1 to 1 percent on the weight of the graft product-cross linker mixture.

The following equations illustrate the chemistry believed to be involved in the curing of graft products prepared according to the invention. Equations I are directed to the graft product as prepared to contain groups hydrolyzable by ambient moisture while Equations II have relation to the curing as effected with a cross-linking agent and catalyst.

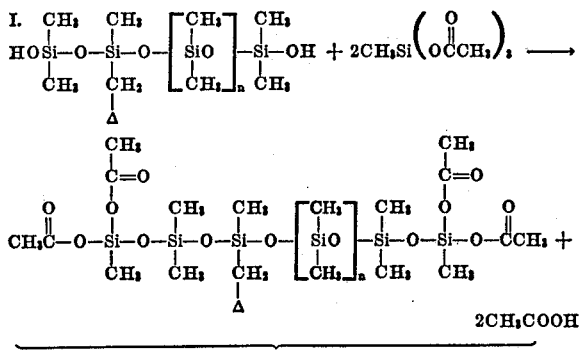

X Units + $H_2O$ (atmospheric) → cross-linked network structure + $CH_3COOH$   Δ = organic polymeric segment

II.

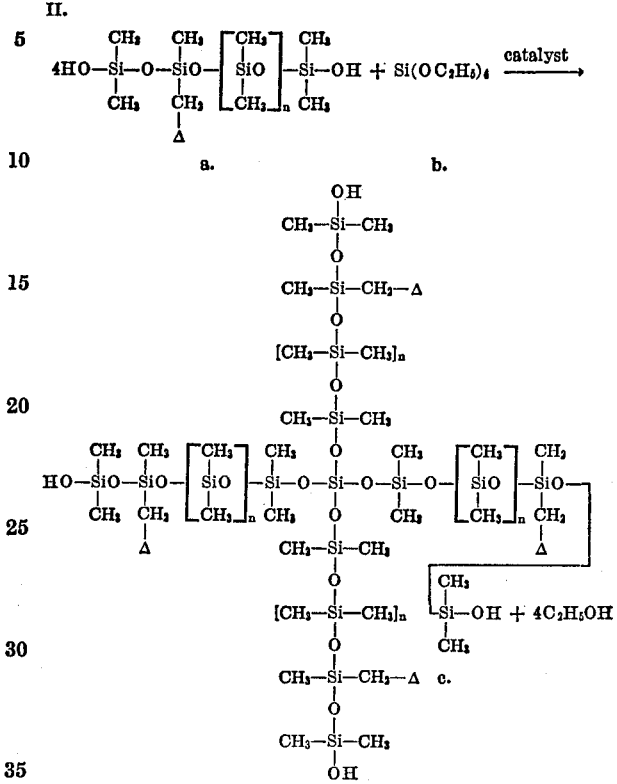

Further condensation of —SiOH groups in c. with b and a. = cross-linked network. Δ = organic polymeric segment Table I below provides a comparison between two conventional products identified as products "A" and "B" and five products (C–G) prepared according to the invention as one-component systems using in each case a graft polymer derived from a reaction mixture containing three parts by weight of a 50–50 mixture of butyl acrylate and styrene and two parts by weight of hydroxyorganopolysiloxane. The hydroxy organopolysiloxane had a viscosity of 400 centipoises except in the case of product C, where the viscosity was 2,000 centipoises. The curing of each of products C–G was initiated by the addition to the graft product of methyltriacetoxysilane, two parts of the silane being used for each 100 parts of the polymer. The cure period was seven days in all cases, including products A and B.

It is to be emphasized that none of products C–G contained any filler material, whereas A and B, which are based on pure silicone rubber, are fully loaded with reinforcing fillers. When fillers are omitted from the conventional products they are so lacking in strength that they have no practical value.

Table I is significant in that it shows that products are obtainable according to the invention which, even without reinforcing fillers, compare more than favorably to the conventional silicone products:

TABLE I

|  | A | B | C | D | E | F | G |
|---|---|---|---|---|---|---|---|
| Tensile strength, ASTM 412 | 259 | 426 | 350 | 494 | 357 | 595 | 492 |
| Elongation, percent ASTM 412 | 581 | 529 | 600 | 427 | 428 | 456 | 438 |
| Tear resistance, ASTM 624 | 33 | 32 | 35 | 49 | 58 | 68 | 33 |
| Hardness, shore A, ASTM 2240 | 21 | 27 | 55 | 60 | 60 | 65 | 65 |

There are several applications where the presence of filler materials in an RTV composition is undesirable.

This is so, for example, where it is desired to lay down the composition over a substrate from a liquid vehicle to produce a flexible coating and where it is essential that the coating be sufficiently transparent or curing that the substrate is visible. The prior silicone RTV compositions are not adapted for the indicated purpose, since they must be reinforced and at present, at least, there are no suitable transparent reinforcing fillers available. The compositions herein since they do not require reinforcement for adequate strength answer nicely to the problem when laid down as a thin film.

It is not meant by the foregoing to imply that the present invention is in any way restricted to unfilled compositions. Indeed, its greatest commercial potential is believed to lie in the direction of filled formulations. Fillers employed may be reinforcing or nonreinforcing, fibrous or nonfibrous. Thus, in general, substantially any of the fillers which have been hitherto employed in the compounding of silicone rubbers may be used in the practice of the invention. As exemplary of reinforcing fillers may be mentioned: fumed silicas, high-surface-area precipitated silicas, silica aerogels and the like. The coarser silicas, as diatomaceous earths and crushed quartz, are examples of nonreinforcing filler materials having application. In this connection, metallic oxides as titanium oxide, ferric oxide, zinc oxide, etc. also should be noted. Applicable fibrous fillers include asbestos and fibrous glass.

Considering the effect of moisture on the one-component compositions herein, it is manifestly important that the filler material be dry when admixed with the graft product. The quantity of filler employed depends on the nature of the particular filler and the properties desired in the final product.

Where the composition is to be used in caulking or for a similar purpose, care should be exercised to select a filler which will preclude any tendency of the composition to slump during application or thereafter. The term "Slump," of course, refers to gravity-induced flow of such a material with resultant development of areas of nonuniform section.

Apart from fillers as before mentioned, compositions conforming to the invention may contain coloring agents, thixotropic agents, agents capable of preventing the passage of ultraviolet light, desiccants and antioxidants, for instance. Also, depending upon the use to which the composition is to be put, it may or may not be desirable or necessary to include a conductive material—graphite for example.

Compositions conforming to the invention can be tailored to fit various specifications as to cure times. In mold-making, for instance, the working time from the pot using a two-component system is more or less conventionally calculated as of the order of 2–2½ hours. Thus, to meet this requirement, the materials used in the preparation of the composition are so selected and proportionated that substantial stiffening of the composition will not occur until after expiration of such period of time.

The composition, prepared as a one-component system as for caulking, is normally applied from the tube, hence working time is of little moment. Normally, the caulking is tack-free within ½ to 3 hours, is substantially cured after 24 hours and completely cured after 7 days. These periods, of course, vary somewhat as to any given composition with changes in humidity and also with changes in temperature. In general, the higher the temperature and humidity the faster the cure.

The composition herein, assuming proper packaging, show an excellent shelf life, which is to say that they can be stored for prolonged periods of time without adverse effect.

The following Table (II) affords a comparison between the previously mentioned conventional products A and B with products C–G, as filled.

TABLE II

|  | | Filled | | | | | |
|---|---|---|---|---|---|---|---|
|  | A | B | C[1] | D[2] | E[3] | F[4] | G[5] |
| Tensile strength, ASTM 412 | 259 | 426 | 568 | 623 | 698 | 557 | 706 |
| Elongation, percent, ASTM 412 | 581 | 529 | 508 | 510 | 603 | 465 | 561 |
| Tear resistance, ASTM 624 | 33 | 32 | 68 | 65 | 94 | 150 | 74 |
| Hardness, shore A, ASTM 2240 | 21 | 27 | 66 | 64 | 62 | 75 | 60 |

[1] 30 parts by weight crushed silica per 100 parts graft polymer.
[2] 1 part by weight fumed silica per 100 parts graft polymer; 2.5 parts by weight acrylonitrile-treated precipitated silica per 100 parts graft polymer.
[3] 4.5 parts by weight fumed silica per 100 parts graft polymer; 1 part by weight thixotropic agent per 100 parts graft polymer.
[4] 40 parts by weight calcium silicate per 100 parts graft polymer; 4 parts by weight thixotropic agent per 100 parts graft polymer.
[5] 8.5 parts by weight of thixotropic agent per 100 parts graft polymer.

From Table II the relatively high tensile strength of the compositions conforming to the invention (products C–G) is to be especially noted. This increased tensile is achieved without significant change in the elongation at break, yet with a substantial increase in hardness—a pronounced advantage in many applications.

Various aspects of the invention are further illustrated by the following examples which are not to be taken as in any way limiting the scope thereof. All parts are by weight unless otherwise specified.

EXAMPLE I

In a one-liter flask were added 125 parts of styrene, 102 parts of butyl-acrylate, 152 parts of 610 cps. hydroxy-terminated polydimethylsiloxane and 1 part of t-butyl peroxide. The mixture was heated to 125° C. and stirred at 80 r.p.m. for 24 hours. The residual monomers were removed at 125° C. under reduced pressure. The product was a white opaque liquid having a viscosity of 14,500 cps. It was well grafted, as shown by extraction with acetone. After three extractions only about 2 percent of acetone-insoluble material remained, representing unreacted siloxane.

EXAMPLE II

In a one-gallon stainless steel reactor was added 728 parts of styrene, 897.2 parts of butyl acrylate, 1083.5 parts of 1340 cp. hydroxy-terminated polydimethylsiloxane and 8.13 parts of di-tert-butyl peroxide. The mixture was heated to 130° C. and stirred at 270 r.p.m. for 4 hours. The residual monomers were removed at 125° C. under reduced pressure. The product obtained in 90 percent yield was a white opaque liquid having a viscosity of 28,000 cps.

EXAMPLE III

Five-pound quantities of gifted siloxanes were prepared in a stirred, jacketed, stainless steel reactor. The charge in each case comprised 40 percent by weight of 1,900 cps. hydroxy-terminated polydimethylsiloxane and 60 percent by weight of styrene and butyl acrylate in various proportions. In each run, one-half percent of t-butyl peroxide was added, whereafter the mixture was heated for 6 hours at 125° C. including about 20 minutes warm-up. Sampling at intervals showed that the reaction was 92 percent complete in 5 hours and 95 percent in 6 hours with very little variation. Stripping of unreacted monomers was effected by applying a vacuum of 1 mm. or less while continuing to heat and stir for another hour. Pertinent data are given below:

| Sample | Styrene, percent | Butyl acrylate, percent | Product viscosity, cps. |
|---|---|---|---|
| 1 | 24 | 36 | 52,260 |
| 2 | 27 | 33 | 46,400 |
| 3 | 30 | 30 | 44,000 |
| 4 | 33 | 27 | 43,000 |
| 5 | 39 | 21 | 42,400 |

EXAMPLE IV

When thirty parts of each of the above graft polymers were added to 3 parts of vinyltriacetoxysilane with mixing, products were obtained which quickly became rubber-like at room temperature.

EXAMPLE V

One hundred parts of Sample 1 (Example III) were mixed with 2 parts of methyltriacetoxysilane, 15 parts of clay (Whitex), and 25 parts of ground silica (Neo Novacite, 7 micron particle size) and the mixture cast into 70-mil test sheets. After 7 days exposure to air at room temperature, a rubber-like material having the following properties was obtained:

| | |
|---|---|
| Tensile strength _____p.s.i__ | 488 |
| Elongation _____percent__ | 553 |
| Tear strength _____pounds__ | 42 |
| Shore A hardness _____ | 56 |

EXAMPLE VI

One hundred parts of a graft polymer obtained as per Example II were mixed with 2 parts of methyltriacetoxysilane, 3.56 parts Cab-O-Sil (fumed silica) and 15 parts Cab-O-Lite (calcium silicate) and the mixture cast into 70-mil test sheets. After 7 days exposure to atmospheric air at room temperature, the material showed the following:

| | |
|---|---|
| Tensile strength _____p.s.i__ | 588 |
| Elongation _____percent__ | 513 |
| Tear strength _____pounds__ | 71 |
| Shore A hardness _____ | 66 |

EXAMPLE VII

One hundred parts of a graft polymer obtained as per Example III (Sample 3) was mixed with 1.5 parts of methyltriacetoxysilane, 1.75 parts of Cab-O-Sil (fumed silica) and 15 parts of ground silica (Daper Novacite-variable particle size) and the mixture cast into 70-mil test sheets. After 7 days exposure to atmospheric air at room temperature, the following values were obtained:

| | |
|---|---|
| Tensile strength _____p.s.i__ | 404 |
| Elongation _____percent__ | 382 |
| Shore A hardness _____ | 66 |

EXAMPLE VIII

To a one-liter flask were added 125 parts of styrene, 102 parts of butylacrylate, 152 parts of 610 cps. hydroxy-terminated polydimethylsiloxane and 1.1 parts of t-butyl peroxide. The mixture was heated to 125° C. and stirred at 280 r.p.m. for 24 hours. The residual monomers were removed at 125° C. under reduced pressure. The product at this point was a white opaque liquid having a viscosity of 14,500 cps. It was well grafted, as shown by extraction with acetone. After three extractions only about 2 percent of acetone-insoluble material remained, representing unreacted siloxane. Evaporation of volatile material showed that 97.8 percent of the organic monomers had reacted.

One hundred parts of the above product were mixed with 1 part of partially hydrolyzed ethyl silicate ("Ethyl Silicate 40") and 0.5 part of dibutyltin butoxychloride, cast into test sheets 70 mil thick, and cured at room temperature for 7 days. Physical testing of the cured product gave the following:

| | |
|---|---|
| Tensile strength _____p.s.i__ | 994 |
| Elongation _____percent__ | 358 |
| Shore A hardness _____ | 75 |

EXAMPLE IX

A grafted siloxane was obtained by heating at 125° C. for 16 hours 61 parts of butyl acrylate, 49 parts of styrene, 10 parts of vinyltriethoxysilane, 0.12 part of t-butyl peroxide and 120 parts of 610 cps. hydroxy-terminated polydimethylsiloxane. The conversion of organic monomers was 90 percent and the viscosity of the product 6,300 cps. When mixed with 0.5 percent of dibutyltin butoxychloride and cured for 7 days, an elastomer was obtained with a tensile strength of 380 p.s.i., an elongation of 400 percent, and a Shore A hardness of 38.

EXAMPLE X

A grafting operation similar to Example III was carried out with the same quantities of materials except that the hydroxy-terminated polydimethylsiloxane was reduced in quantity to 72 parts, i.e. 30 percent of the total weight. The conversion of organic monomers was 95.4 percent, the product viscosity 17,2000 cp. After the addition of 0.5 percent of dibutyltin butoxy chloride and curing for days, the product showed a tensile strength of 540 p.s.i., 480 percent elongation, and a hardness of 38.

EXAMPLE XI

A grafted siloxane was made by heating 171 parts of butyl methacrylate, 90 parts of butyl acrylate, 19 parts of vinyltriethoxysilane, 0.28 parts of t-butyl peroxide, 168 parts of 610 cps. hydroxy-terminated polydimethylsiloxane at 125° C. for 24 hours. The organic monomer conversion was 100 percent and the viscosity of the graft polymer was 11,600 cps.

A portion of the polymer was cured with 0.3 percent of stannous octoate for 7 days to obtain a product having a tensile strength of 172 p.s.i., 366 percent elongation, and a Shore A hardness of 20.

Another sample was cured with 1 percent of dibutyltin butoxychloride. Result: a tensile strength of 323 p.s.i., 241 percent elongation and a Shore A hardness of 25.

EXAMPLE XII

The following reactants were charged to a nitrogen-flushed pint bottle:

| | |
|---|---|
| Vinyl acetate _____ml__ | 92 |
| 1,900-cp OH-fluid _____g__ | 86 |
| t-Butyl peroctoate _____ml__ | 0 |

The bottle was placed in a rotating water bath maintained at 80° C. The product, after 6 hours reaction time, was an opaque, white, viscous fluid. When cured with cross-linker and catalyst as above, a relatively hard rubber was obtained.

EXAMPLE XIII

About 91 parts of hydroxy-terminated polydimethylsiloxane fluid (1928 cs.), 64 parts of butyl acrylate, 27 parts of acrylonitrile and about 0.45 part of t-butyl peroctoate were added to a reactor. The mixture was heated to 80° C. with agitation for about 1.2 hours. The product was an opaque, light tan liquid having a viscosity of 14,000 cs.

In a comparative example, about 157 parts of hydroxy-terminated polydimethylsiloxane fluid (1,000 cs.), 52 parts of acrylonitrile, 7.8 parts of silica (HS-5) and 5.0 parts of benzoyl peroxide were added to a reactor. The mixture was heated to 53° C. with agitation under an atmosphere of nitrogen. The reaction became extremely vigorous and as the temperature increased rapidly to 67° C., the reaction mass solidified and was unusable.

EXAMPLE XIV

About 75.4 parts of hydroxy-terminated polydimethylsiloxane fluid (400 cs.), 2.6 parts of methacrylic acid, 51.3 parts of butyl acrylate, 59.3 parts of styrene and 0.57 part of di-t-butyl peroxide were added to a reactor. The mixture was heated to 130° C. with agitation for about 7 hours. The product was an opaque, white liquid having a viscosity of 11,000 cs.

In a comparative example, a similar concentration of methacrylic acid and hydroxy-terminated polydimethylsiloxane fluid was reacted in the presence of t-butyl peroctoate under similar conditions, yielding a soft grease-like composition.

The invention claimed is:

1. A liquid composition substantially free of solvent comprising a graft copolymer resulting from the reaction of an organopolysiloxane having a viscosity of from about 100 to 30,000 centipoise at 25° C. and at least one monoethylenic unsaturated monomer, said monomer being present in an amount of from 30 to 75 percent by weight based on the weight of said graft copolymer, said organopolysiloxane having terminal silicon-bonded groups selected from the class consisting of groups hydrolyzable by ambient moisture and hydroxyl groups in which the average number of hydroxyl groups bonded to the organopolysiloxane molecule is from about 1.75 to 2.25 and being characterized in that the organic portion of said organopolysiloxane consists predominately of lower alkyl groups in which at least one of said alkyl groups has been modified by having a polymer grafted thereto, said polymer being derived from (1) monoethylenic unsaturated monomers selected from the class consisting of vinyl aromatic compounds and unsaturated esters of monobasic organic acids in which either the esterifying group or the acid is unsaturated, and (2) combinations of these monomers in major amounts with other monoethylenic unsaturated monomers selected from the class consisting of monobasic acids, amides, nitriles, anhydrides, silanes and aliphatic hydrocarbons.

2. The liquid composition of claim 1 in which the organic polymer is present in an amount of from 40 to 65 percent.

3. The liquid composition of claim 1 in which the organic polymer is derived predominately from unsaturated monomers selected from the class consisting of vinyl aromatic compounds and unsaturated esters of organic acids in which either the esterifying group or the derivative acid is unsaturated.

4. The liquid composition of claim 1 in which the organic polymer is derived from a major amount of unsaturated monomers selected from the class consisting of vinyl aromatic compounds and unsaturated esters of organic acids in which either the esterifying group or the derivative acid is unsaturated and a minor amount of unsaturated monomers selected from the class consisting of acids, amides, nitriles, anhydrides, silanes, and aliphatic hydrocarbons.

5. The liquid composition of claim 1 in which the organic polymer is derived from an acrylate and unsaturated monomers selected from the class consisting of acids, amides, nitriles, anhydrides, silanes, and aliphatic hydrocarbons.

6. The liquid composition of claim 1 in which the organic polymer is derived from two or more unsaturated monomers.

7. The composition of claim 1 in which the organopolysiloxane has terminal hydroxyl groups and further contains a silane of the formula $XSiY_3$ in which X is a relatively inert group and Y is group hydrolyzable by ambient moisture.

8. The composition of claim 1 in which the organopolysiloxane has terminal hydroxy groups and further contains a cross-linking agent selected from the group consisting of polyalkoxysilanes and polyalkoxysiloxanes and a curing catalyst.

9. The composition of claim 8 in which the catalyst is a tin catalyst.

10. The cured composition of claim 7 after exposure to atmospheric moisture.

11. The cured composition of claim 8.

References Cited

UNITED STATES PATENTS

| 2,959,569 | 11/1960 | Warrick | 260—827 |
| 3,127,363 | 5/1964 | Nitzsche | 260—827 |
| 3,471,588 | 10/1969 | Kanner | 260—827 |
| 3,531,424 | 9/1970 | Swanson | 260—827 |
| 3,555,109 | 1/1971 | Getson | 260—827 |

FOREIGN PATENTS

| 860,327 | 2/1961 | Great Britain | 260—827 |

PAUL LIEBERMAN, Primary Examiner

U.S. Cl. X.R.

260—37 SB, 46.5 R